United States Patent [19]

Wang et al.

[11] Patent Number: 5,021,517

[45] Date of Patent: Jun. 4, 1991

[54] PROCESS FOR THE FABRICATION OF RODLIKE POLYMER REINFORCED MOLECULAR COMPOSITES INTO SHAPED ARTICLES

[75] Inventors: Chyi-Shan Wang, Fairborn; Ivan J. Goldfarb; Thaddeus E. Helminiak, both of Dayton, all of Ohio

[73] Assignee: The United States of America as represented by the Secretary of the Air Force, Washington, D.C.

[21] Appl. No.: 360,950

[22] Filed: Apr. 28, 1989

[51] Int. Cl.$^5$ .............................................. C08F 283/04
[52] U.S. Cl. ..................................... 525/417; 525/425; 525/432; 252/186.21
[58] Field of Search ................... 252/186.21; 525/417, 525/425, 432

[56] References Cited

U.S. PATENT DOCUMENTS

| 4,207,407 | 6/1980 | Helminiak et al. | 525/432 X |
|---|---|---|---|
| 4,208,505 | 6/1980 | Groult et al. | 525/432 X |
| 4,631,318 | 12/1986 | Hwang et al. | 525/417 X |
| 4,749,753 | 6/1988 | Nishihara et al. | 525/417 X |
| 4,806,419 | 2/1989 | Stenzenberger | 525/417 X |
| 4,831,104 | 5/1989 | Aya et al. | 525/432 X |

*Primary Examiner*—Peter A. Nelson
*Attorney, Agent, or Firm*—Charles E. Bricker; Donald J. Singer

[57] ABSTRACT

A process for fabricating rod-like aromatic heterocyclic polymer-reinforced composite materials into shaped articles which comprises the steps of:

(a) dissolving a rigid-rod aromatic heterocyclic polymer and a flexible, coil-like thermoplastic polymer in a common solvent at a concentration less than the critical concentration point of the solution;

(b) extruding the solution resulting from step (a) into a liquid bath for removing the solvent;

(c) placing the extrudate from step (b), in the liquid-wet state, into a mold, and consolidating the extrudate in the mold to provide a molded article;

(d) drying the molded article resulting from step (c); and (e) compression molding the article to provide a fully consolidated, solid article.

12 Claims, No Drawings

PROCESS FOR THE FABRICATION OF RODLIKE POLYMER REINFORCED MOLECULAR COMPOSITES INTO SHAPED ARTICLES

RIGHTS OF THE GOVERNMENT

The invention described herein may be manufactured and used by or for the Government of the United States for all governmental purposes without the payment of any royalty.

BACKGROUND OF THE INVENTION

The invention relates to a process for fabricating polymeric composites of rigid rod aromatic heterocyclic polymers and flexible matrix polymers into shaped articles.

Recent developments in the synthesis of rigid rod-like and flexible coil aromatic heterocyclic polymers has created the opportunity to develop a new class of polymeric structural materials. Of special interest are polymeric composites composed of these rigid rod and flexible coil polymers. The intent is to reinforce the flexible coil polymers with the rigid rod polymers and to fabricate these composites into fiber and film forms with similar or superior properties to that of conventional chopped fiber composites. U.S. Pat. No. 4,207,407 discloses polymeric composites of rod-like aromatic heterocyclic polymers and coil-like aromatic heterocyclic polymers and their method of preparation.

As is well known, the strength and durability of the composite is largely dependent upon the existence of an extensive long lasting load-transferring interface between the reinforcing constituent and the matrix. If this interfacial area is small the strength of the composite would be greatly impaired. This is the case when the reinforcing rigid rod polymers segregate into large aggregates with sizes in the micron range. Then, due to a smaller specific surface area (area per unit mass) a high strength, durable reinforced composite cannot be obtained. The intent is then to eliminate this reinforcing constituent-matrix interfacial problem. A need exists, therefore, for fabricating molecular composites with the reinforcing rigid rod polymers molecularly dispersed in a continuous flexible coil polymer matrix having superior strength dimensional stability and durability.

Since the reinforcing rigid rod polymers are aromatic heterocyclic polymers they are not amenable to conventional melt processing. They can only be fabricated into useful articles such as fibers and films through solution processing which requires strong mineral or organic acid solvents. Hence, the solution behavior of the two polymer constituents in a common solvent is of critical importance in determining how efficiently the rigid rod-like polymer molecules can be dispersed in the flexible coil-like polymer matrix when fabricated through solution processing.

Studies of the solution morphology of polymer blends of rigid rod and flexible coil heterocyclic polymers have indicated there exists, for any composition of these polymers, a critical concentration point, $C_{cr}$, at ambient conditions. Above a critical concentration, the ternary solution containing rigid rod polymer, flexible coil heterocyclic polymer and solvent segregates into two coexisting phases one optically anisotropic (liquid crystalline) and the other isotropic. The anisotropic domains are composed primarily of rigid rod polymers, while the isotropic matrix retains almost all the flexible coil heterocyclic polymers. When these polymers blends are processed above their critical concentration point at ambient conditions, a macroscopically phase separated composite system is obtained in which rigid rod polymer aggregates are dispersed in the flexible coil heterocyclic polymer matrix.

From a mechanics of composites point of view this phase segregation (aggregate formation) behavior in a composite system is a detrimental feature. The aggegates do not have a large enough aspect ratio (ratio of the length to diameter) as compared to chopped fibers in a conventional composite system. Additionally, the aggregates offer too small a specific interfacial area between them and the matrix to achieve the high rigidity and strength required for a structural material. In short, the reinforement efficiency of a molecular composite is greater than that of a conventional chopped-fiber composite.

As discussed previously, composite materials comprising rigid-rod aromatic heterocyclic polymers and coil-like aromatic heterocyclic polymers are not amenable to conventional melt processing. Hwang et al, U.S. Pat. No. 4,631,318, disclose melt-processable composite materials comprising about 30 to 60 weight percent of a rod-like aromatic heterocyclic polymer dispersed in about 70 to 40 weight percent of a coil-like thermoplastic polymer matrix.

Nishihara et al, U.S. Pat. No. 4,749,753 disclose an intimate mixture comprising a substantially linear aromatic polyazole and a sparingly crystalline aromatic copolyamide. Both of these references disclose the fabrication of sheet or film from their composite materials. For the fabrication of bulkier compontents, both require lamination of a plurality of sheets into thick pieces by compression molding. Unfortunately, the laminated articles have very weak bonding between adjacent films or sheets and delaminate easily under stress or at elevated temperatures. Nishihara et al overcome this problem by adhering the films together with a layer of matrix material coated onto the surface of each film prior to lamination.

Accordingly, it is an object of the present invention to provide a process for fabricating rod-like aromatic heterocyclic polymer-reinforced composite materials into shaped articles.

Other objects and advantages of the present invention will be apparent to those persons skilled in the art from a reading of the following description of the invention.

SUMMARY OF THE INVENTION

In accordance with the present invention there is provided a process for fabricating rod-like aromatic heterocyclic polymer-reinforced composite materials into shaped articles which comprises the steps of:

(a) dissolving a rigid-rod aromatic heterocyclic polymer and a flexible, coil-like thermoplastic polymer in a common solvent at a concentration less than the critical concentration point of the solution;

(b) extruding the solution resulting from step (a) into a liquid bath for removing the solvent;

(c) placing the extrudate from step (b), in the liquid-wet state, into a mold, and consolidating the extrudate in the mold to provide a molded article;

(d) drying the molded article resulting from step (c); and (e) compression molding the article to provide a fully consolidated, solid article.

It is contemplated that molded articles fabricated in accordance with the process of the present invention will have a minimum thickness of about 0.5 mm, although the process may be employed to fabricate films and sheets having a lesser thickness.

The rod-like aromatic heterocyclic polymers used in the practice of the present invention exhibit 'para' ordered geometry. Examples of such polymers, which are described in the literature, include those consisting essentially of repeating units having the following formula:

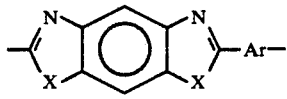

or

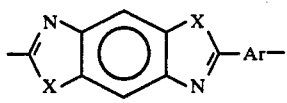

wherein X is NH, N$\phi$, O or S, where $\phi$ is phenyl, and wherein Ar is

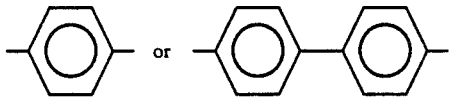

(1,4-phenylene)   (4,4'-biphenylene)

In the foregoing formulas, the number of recurring units is such that the polymers have an aspect ratio (ratio of molecular length to width or diameter) of at least 50, and preferably above 200. Such polymers have an intrinsic viscosity of at least 2-3 dl/g, preferably 10 to 50, inclusive, as determined in methanesultonic acid at 30° C. Examples of rod-like polymers that can be used include those disclosed in U.S Pat. No. 4,108,835, incorporated by reference herein.

Flexible coil polymers used in combination with the rigid rod polymers are any thermoplastics, which will be dissolved in a common solvent with the rigid rod polymers without being chemically degraded. Illustrative examples of suitable thermoplastic include those consisting essentially of repeating units having the following formulas:

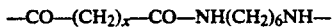

when
x=4, nylon 6,6,
x=8, nylon 6,10;

when
x=5, nylon 6,
x=6, nylon 7;

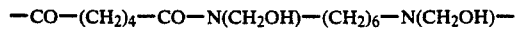

(Nylon FE3303)

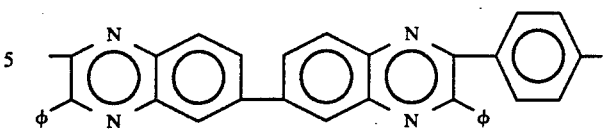

wherein the number of repeating units is such that the polymer has a molecular weight above the chain entanglement molecular weight as determined by its viscoelastic properties in solutions. Such polymers generally have an intrinsic viscosity of about 0.1 to 5 dl/g, as determined in methanesulfonic acid at 30° C. Other thermoplastic polymers are also contemplated herein. These others include, for example, any thermoplastic polymer which may be dissolved in a common solvent with the aforementioned rigid rod aromatic heterocyclic polymer. Molecular weights of these thermoplastics should be sufficient to provide solution integrity to provide sufficient entanglement density to result in a good film or fiber.

More specifically, the present invention resides in a new process for fabricating molecular composite articles, sequentially comprising the following steps:

1. Determine the critical concentration point at any particular temperature of a ternary solution prepared by dissolving any composition (by weight percent) of rigid rod polymers and flexible coil thermoplastic polymers in a common good solvent, (such as methanesulfonic acid or polyphosphoric acid) by slowly titrating an originally biphasic, stir opalescent solution of known concentration with solvent until a point is reached at which the solution becomes isotropic and stir-opalescence has ceased; the critical concentration point of the ternary solution is defined as the maximum concentration of polymers in a solvent at which it is still optically isotropic at any particular temperature and pressure. At this point, the ternary solution is optically transparent.

2. Prepare, a ternary solution with a concentration, for example, at about 0.1 to one weight percent lower than its corresponding critical concentration point, depending upon the rheological characteristics of each individual polymer in the solvent, to ensure that no extension (or pressure) induced phase-seperation or segregation occurs in the solution;

3. Transfer the isotropic solution to the solution reservoir of an extruder under an inert atmosphere;

4. Extrude the solution through a suitable spinnerette or die into a coagulation bath of deionized water or other washing medium such as weakly acidic medium;

5. Wash the extrudate thoroughly to remove residual solvent;

6. place the wet extrudate into a mold and apply heat and pressure under controlled conditions to consolidate the extrudate;

7. Dry the consolidated article to remove solvent and coagulant residues; and.

8. Compression mold the dry article.

Consolidation of the extrudate in a mold is carried out with the extrudate in the wet state. It is presently preferred to first apply an increasing pressure of 0 up to about 40 to 50 MPa, at ambient temperature, over a period of about 15 minutes to 2 hours or more, followed by increasing temperature from ambient up to a temperature, e.g., about 5° to 50° C., below the decomposition or boiling temperature of the solvent or the normal melt temperature of the thermoplastic polymer, whichever is less, over a period of about 15 minutes to 2 hours or more. The rates of increase of pressure and temperature are, to a certain extent, dependent upon the volume of the mold and should be determined in practice.

Drying of the consolidated article is carried out under vacuum at about 100° C. for about 12 to 48 hours followed by heating to a temperature of about 30° to 60° C. above the boiling temperature of the solvent or about 25° to 75° C. below the melt temperature of the thermoplastic polymer, whichever is greater, for about 12 to 48 hours.

The article is then compression molded under a pressure of about 40 to 50 MPa and a temperature at or slightly above the melt temperature of the thermoplastic polymer, e.g., about 0° to 50° C. above the melt temperature of the thermoplastic polymer.

The followings examples illustrate the invention.

EXAMPLE

A series of molecular composites was prepared from poly(p-phenylenebenzbisthiazole) (PPBI) ($\eta_{inh}$=21.4 dl/g in, methanesulfonic acid) and Zytel 42 (nylon 6,6 available from E. I. Dupont Chemical Co.) as shown in the Table below. Zytel 42 is a semicrystalline nylon which has a nominal molecular weight of 30,000 g/mol and a melt temperature ($T_m$) of 255° C. In each preparation, the common solvent was methanesulfonic acid (MSA).

Initially, PBT and nylon 6,6 were codissolved in MSA to prepare a solution below the critical concentration ($C_{cr}$) at which an isotropic-to-anistropic phase transition occurs. This is a necessary condition for attaining a molecularly dispersed composite. The exact concentration prepared for each PBT/nylon solution is given in the Table. Such a concentration would allow the solution to flow continually at a flow rate of about 1 ml/min. In coagulation, the solution flowed slowly from a separatory funnel into a large quantity of stirred distilled water. The molecular composites ended up as entangled continuous thin filaments. The composites were thoroughly washed with free running distilled water for at least two days and, thereafter, kept wet at all times.

The wet molecular composites were consolidated into desired experimental specimens under pressure and temperature. This was conducted in a closed mold with the temperature and pressure applied by a microprocessor-controlled hot press (Wabash 30-1515-2TMX). The forming was carried out first at room temperature with a pressure ramp from 0 to 45 MPa in ½ hour, followed by a temperature ramp to 175° C. in ½ hour, then held at that condition for another ½ hour. After consolidation, the specimen was dried under vacuum at 100° for 24 hours and subsequently at 175° C. for 24 hours to remove solvent and coagulant residues. The consolidated and dried specimens were then compression molded at 45 MPa, gradually increasing the temperature to the melting temperature of the nylon.

An Instron Universal Test Machine (Model 1122) was used to measure the mechanical properties of the PPBT/nylon molecular composites. The experimental specimens were in a dogbone shape with the center portion about 28 mm long, 4.5 mm wide and 1.0 mm thick. The enlongation of the specimens was monitored by a half inch gauge length extensometer. A crosshead speed of 0.05 cm/min was used in all measurements. For each PPBT/nylon composition, the tensile properties were determined from measurements of 4 to 6 specimens. The solution concentration and tensile properties of the various composition PPBT/nylon molecular composites are listed in the Table.

TABLE

Tensile Properties of Bulk PPBT/Nylon 6,6 Molecular Composites

| PPBT/Nylon composition wt/wt | Soln concn. wt % | TS MPa | E GPa | Elongation at break, % |
|---|---|---|---|---|
| 0/100* | — | 85 | 2.82 | 90 |
| 10/90 | 2.00 | 85 ± 7 | 5.4 ± 0.3 | 1.77-2.35 |
| 20/80 | 1.43 | 106 ± 13 | 7.4 ± 0.1 | 1.90-4.00 |
| 30/70 | 1.00 | 130 ± 23 | 11.4 ± 1.0 | 1.05-2.45 |
| 40/60 | 0.80 | 146 ± 12 | 14.9 ± 1.0 | 1.10-1.47 |
| 40/60** | 0.80 | 146 ± 10 | 14.7 ± 1.0 | 1.10-1.20 |
| 50/50 | 0.67 | 183 ± 10 | 20.8 ± 1.9 | 0.81-1.13 |
| 60/40 | 0.59 | 172 ± 6 | 20.5 ± 2.1 | 0.82-1.12 |
| 60/40** | 0.59 | 93 ± 3 | 13.4 ± 1.2 | 0.65-0.81 |

Key:
*nominal tensile properties of Zytel 42.
**specimens prepared from a blended slurry.

As shown in the above table, the tensile strength (TS) and Young's modulus (E) of these molecular composites increase significantly with PPBT content to about 50wt % and then decrease slightly to 60 wt %. The decrease of tensile properties at higher PBT content is believed due to insufficient matrix material fusing the molecular composite filaments together. For comparison specimens at 40/60 and 60/40 compositions were also prepared from the slurry blended from the wet molecular filaments. As shown in the Table, the 60/40 composition specimens prepared from the slurry exhibit lower properties than those prepared from continuous filaments. As to the 40/60 composition specimens, those prepared from the slurry had tensile properties essentially identical to those of the continuous filaments, indicating that the fusion of the fine particles provides a bond almost as strong as continuous filaments at this composition. The fusion between 40/60 composition molecular composites was excellent even at elevated temperatures.

Various modifications may be made to the invention as described without departing from the spirit of the invention or the scope of the appended claims.

We claim:

1. A process for fabricating rod-like aromatic heterocyclic polymer-reinforced composite materials into shaped articles which comprises the steps of:
   (a) dissolving a rigid-rod aromatic heterocyclic polymer and a flexible, coil-like thermoplastic polymer in a common solvent at a concentration less than the critical concentration point of the solution;
   (b) extruding the solution resulting from step (a) into a liquid bath for removing the solvent;
   (c) placing the extrudate from step (b), in the liquid-wet state, into a mold, and consolidating the extrudate in the mold to provide a molded article;
   (d) drying the molded article resulting from step (c); and
   (e) compression molding the article to provide a fully consolidated, solid article.

2. The process of claim 1 wherein said rod-like aromatic heterocyclic polymer consists essentially of repeating units having the following formula:

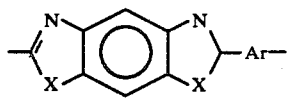

or

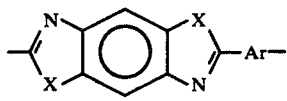

wherein X is NH, Nφ, O or S, where φ is phenyl, and wherein Ar is 1,4-phenylene or 4,4'-biphenylene.

3. The process of claim 2 wherein the number of repeating units is such that the polymer has an aspect ratio of at least 50.

4. The process of claim 2 wherein the number of repeating units is such that the polymer has an aspect ratio of above 200.

5. The process of claim 1 wherein said coil-like polymer is a thermoplastic polymer, which can be dissolved in a common solvent with said rigid rod polymer without being chemically degraded.

6. The process of claim 5 wherein said coil-like polymer is selected from the group consisting of thermoplastic polymers having repeating units of the following formulas: —CO—(CH$_2$)$_x$—CO—NH(CH$_2$)$_6$NH—, wherein x is 4 or 8, —NH—(CH$_2$)$_x$—CO—, wherein x is 5 or 6, —CO—(CH$_2$)$_4$—CO—N(CH$_2$OH)—(CH$_2$)$_6$—N(CH$_2$OH)—, and

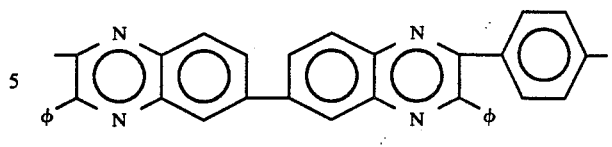

wherein φ is phenyl.

7. The process of claim 6 wherein the number of repeating units in said coil-like polymer is such that the polymer has a molecular weight above the chain entanglement molecular weight as determined by its viscoelastic properties in solution.

8. The process of claim 1 wherein said consolidation step (c) comprises applying an increasing pressure of 0 up to about 40 to 50 MPa, at ambient temperature, over a period of about 15 minutes to 2 hours or more, followed by increasing temperature from ambient up to a temperature below the decomposition or boiling temperature of said solvent or the normal melt temperature of said thermoplastic polymer, whichever is less, over a period of about 15 minutes to 2 hours or more.

9. The process of claim 1 wherein said drying step (d) comprises heating said consolidated article under vacuum at about 100° C. for about 12 to 48 hours followed by heating to a temperature of about 30° to 60° C. above the boiling temperature of said solvent or about 25° to 75° C. below the melt temperature of said thermoplastic polymer, whichever is greater, for about 12 to 48 hours.

10. The process of claim 1 wherein said compression molding step (e) comprises molding under a pressure of about 40 to 50 MPa and a temperature at or slightly above the melt temperature of said thermoplastic polymer.

11. The process of claim 10 wherein said compression molding temperature is about 0° to 50° C. above the melt temperature of said thermoplastic polymer.

12. The process of claim 10 wherein said molded articles have a minimum thickness of about 0.5 mm.

* * * * *

UNITED STATES PATENT AND TRADEMARK OFFICE
CERTIFICATE OF CORRECTION

PATENT NO. : 5,021,517
DATED : June 4, 1991
INVENTOR(S) : Chyi-Shan Wang et al

It is certified that error appears in the above-identified patent and that said Letters Patent is hereby corrected as shown below:

```
Col 1, line 45, a comma should follow "strength".
Col 2, line 6, a comma should follow "view".
Col 3, line 41, "methanesultonic" should read
    --methanesulfonic--.
Col 5, line 24, "Dupont" should read --DuPont--.
```

Signed and Sealed this

Ninth Day of March, 1993

Attest:

STEPHEN G. KUNIN

*Attesting Officer*     *Acting Commissioner of Patents and Trademarks*